W. E. TRENT.
FILTERING PAN.
APPLICATION FILED JUNE 7, 1913.

1,125,769.

Patented Jan. 19, 1915.

WITNESSES:
H. A. Stock
Harry H. Totten

INVENTOR
Walter E. Trent
BY M. A. Acren
ATTORNEY

UNITED STATES PATENT OFFICE.

WALTER E. TRENT, OF RENO, NEVADA.

FILTERING-PAN.

1,125,769.  Specification of Letters Patent.  Patented Jan. 19, 1915.

Application filed June 7, 1913. Serial No. 772,329.

*To all whom it may concern:*

Be it known that I, WALTER E. TRENT, a citizen of the United States, residing at Reno, in the county of Washoe and State of Nevada, have invented certain new and useful Improvements in Filtering-Pans, of which the following is a specification.

The present invention relates to improvements in filter trays or pans and particularly to that type of filter tray or pan designed for separating solids from liquids or semi-liquid solutions, such as slime, pulp, pulverized ores, and cyanid solutions, and is adopted to be employed in that type of apparatus illustrated and described in my pending application Serial No. 738,547, filed Dec. 26, 1912, and the invention has for its principal object to provide a filtering tray or pan having an increased filtering area or surface over that type now employed, and by the use of which, will, greatly increase the capacity of the apparatus without naturally increasing the size thereof, thereby correspondingly reducing the cost of handling the material.

With the above mentioned and other objects in view, the invention consists in the construction and arrangement of parts, hereinafter described, illustrated in the accompanying drawings and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference should be had to the accompanying drawings disclosing one form of my invention and in which—

Figure 1:
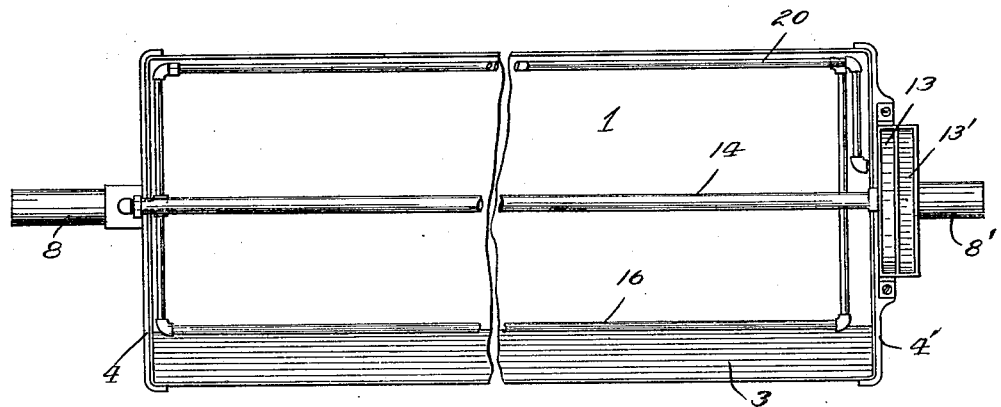
Figure 2:
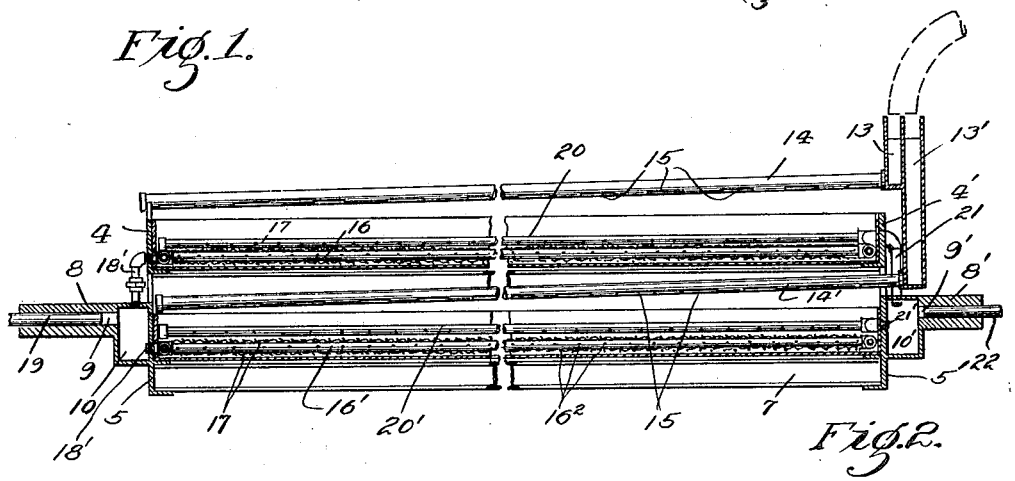
Figure 3:
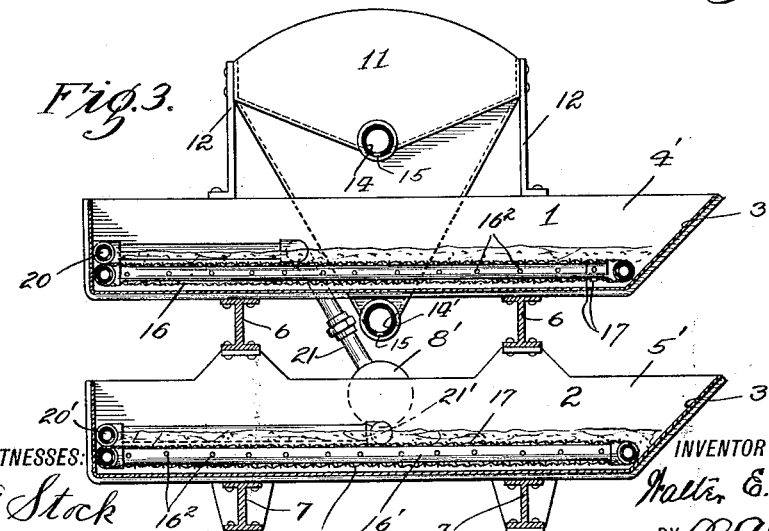

Figure 1 is a top plan view of one of the pans or trays, illustrating the frame for the filter bed or medium situated therein, the slime feed pipe, and the spray pipe for supplying water to the surface of the filter bed for the lubricating thereof. Fig. 2 is a longitudinal vertical central sectional view of Fig. 1, disclosing the arrangement of the trays or pans, the slime feed pipes, the filter or suction connections and the wash water inlet. Fig. 3 is a transverse vertical sectional view of the filter pans or trays, disclosing the arrangement thereof.

As the present invention relates to the trays or pans, it is not thought to be necessary to disclose the manner of mounting the same and the feed supplies for the different fluid mediums, as the same are fully set forth in the beforementioned application in connection with which the trays hereafter described are particularly adapted for use.

Referring more particularly to the drawings, wherein like characters of reference designate corresponding parts throughout the several views, the numerals 1 and 2 designate respectively the upper and lower filtering pans or trays, preferably oblong in shape, and each formed with a beveled side edge 3 and the ends of the respective trays are closed by the end plates 4 and 4' and 5 and 5' secured to and retained in position by the longitudinally extending, parallel spaced members 6 and 7, the members 6 interposed between the lower side of the upper tray and the upper edge of the lower tray, thus retaining the same in spaced relation one above the other, and the members 7 longitudinally supporting the lower tray 2. The end plates 5 and 5' are provided respectively with outwardly extending trunnions 8 and 8', formed respectively with tubular bores 9 and 9' therein, which terminate at their inner ends in the chambers 10 and 10'.

The material or slimes to be treated is fed into the respective pans 1 and 2 from a suitable source of supply into a funnel shaped receiver 11 which rests on the end plate 5' and is supported at its upper end by the brackets 12 carried by the tray 1, and communicating with the lower end of the hoppers 13 and 13' formed in said funnel are the receiving ends of distributing pipes 14 and 14' which extend respectively the full length of the trays 1 and 2 immediately above the same, and are provided with the discharged outlets 15 in the under surface thereof. These outlets 15 may be varied in size in accordance with the material to be treated, and the purpose of this discharge is to supply the requisite material or charge of the semi-liquid material into the trays or pans, for the separation of the solid portions therefrom. Within the trays or pans 1 and 2 are secured in any suitable manner the filters consisting of the frames 16 and 16' composed of pipes formed with perforations $16^2$ therein, each of said frames being covered by a filtering medium or cloth 17, as disclosed in Fig. 3.

The bottom layer of the filtering cloth for each filter is given a coating of any suitable compound to render the same water-proof and thereby tending to protect the bottom of the pans against the action of rust. From one end of the frames 16 and 16′ there extend respectively the pipes 18 and 18′, the former extending through the end plate 4 and into the chamber 10, and the latter extending through the end wall 5 into the chamber where both of said pipes 18 and 18′ are connected with a pipe or connection 19 extended through the opening 9 in the trunnion 8 and which is connected with any suitable source of suction.

The filter trays or pans 1 and 2 are provided adjacent their rear upper edge with the respective perforated water spray pipes 20 and 20′ from one end of which extend the respective pipes 21 and 21′, the former extending through the end plate 4′ and into the chamber 10′, and the latter extending through the end plate 5′ and into the chamber 10′ where both of said pipes connect with a supply pipe 22, extending through the bore 9′ in the trunnion 8′ and which is connected to a suitable water supply. It is to be understood that air under pressure may be admitted through the pipe 22 in place of water although preference is given to water, the water lubricating the upper surface of the filtering cloth in order that the cake formed on the filtering medium within the tray may be readily removed therefrom.

In operation, the material to be treated is fed into the hoppers 13 and 13′ and passes therefrom through the pipes 14 and 14′ onto the filtering surface of the trays. After the trays have been filled, the liquid is drawn from the material to be treated through the filtering cloth, and perforations 16², leaving the solids contained in the material to be treated in a form of a cake resting on the filtering cloth or material. Water is now admitted through the spray pipes 20 and 20′ to thoroughly lubricate the filtering cloth in order that the cake may be readily removed or slip therefrom as the structure is tilted in any suitable manner.

It will be apparent that the filtering surfaces of a filtering pan or tray as constructed above, have been increased in area over the devices of this character now in use, without having materially increased the space occupied by the same, in that a plurality of trays with their associated parts occupy little more space than a single one. Also it will be noted that the trays or pans can be readily operated or dumped of their contents, that the material to be treated is fed simultaneously thereto, is simultaneously treated in both pans or filtering trays, and is simultaneously removed or dumped therefrom.

By increasing the filtering surfaces without materially increasing the space occupied by the pans or trays, I am enabled to treat a greater amount of material in the same time that a lesser amount is at present treated in an apparatus occupying the same space, thus increasing the output and correspondingly reducing the cost of handling of the material.

Having thus described my invention what is claimed as new and is desired to protect by Letters Patent is:—

1. In a device of the class described, the same comprising a plurality of super-imposed horizontally disposed pans, a filtering member mounted in each of said pans, trunnions extended from the ends of one of said pans and on which the same are supported, and apertured conduits extending over the trays for feeding the material to be treated onto said filtering, a delivery receptacle having an outlet passage common to both of said conduits, and connections from said filtering members to a source of suction for withdrawing the liquid from the material to be treated.

2. In a device of the class described, the same comprising a plurality of horizontally disposed pans arranged one above the other in spaced relation and secured together, a filtering member mounted in each of said pans, comprising opposed sheets of filtering cloth, trunnions extended from the ends of one of said pans and by which the pans are supported, means for feeding the material to be treated onto each of said members, connections from a point between said filtering cloths to a source of suction for withdrawing the liquid from the material to be treated, and means projecting from side to side and above said filtering members for supplying a fluid under pressure to said treated material to assist in removing the same from the filtering pans.

3. In a device of the class described, the same comprising a plurality of horizontally disposed pans arranged in a plane one above the other in spaced relation and secured together, a filtering member mounted in each of said pans, hollow trunnions extended from the ends of one of said pans and by which the pans are supported, means carried by and supported above the respective members for feeding the material to be treated thereinto, connections from said filtering members extending through one of said trunnions to a source of suction for withdrawing the liquid from the material to be treated, a fluid supply pipe mounted in each of said pans, and connections from said pipes and extending through the other of said trunnions to a source of fluid supply for supplying a fluid under pressure to said treated material to assist in removing the same from the filtering pans.

4. In a device of the class described, the same comprising a plurality of horizontally disposed pans arranged in a plane one above the other in spaced relation and secured together, a filtering member mounted in each of said pans, said filtering members comprising opposed sheets of filtering material, hollow trunnions extended from the ends of one of said pans and by which all of said pans are supported, means for simultaneously feeding the material to be treated to all of said pans, comprising apertured pipes above the filtering members, a delivery trough common to both of said pipes, and connections from a point between said sheets of filtering material and extending through one of said trunnions for simultaneously drawing the liquid from the material to be treated in all of said pans.

5. In a device of the class described, the same comprising a plurality of horizontally disposed pans arranged in a plane one above the other in spaced relation and secured together, a filtering member mounted in each of said pans, comprising opposed sheets of filtering material, hollow trunnions extended from the ends of one of said pans and by which all of said pans are supported, means for simultaneously feeding the material to be treated to all of said pans, comprising a trough, and an elongated apertured conduit communicating with said trough, there being a conduit positioned above each tray, apertured pipes arranged between the sheets of filtering material, connections from said apertured pipes and extending through one of said trunnions for simultaneously drawing the liquid from the material to be treated in all of said pans, a fluid supply pipe mounted in each of said pans above the filtering member, and connections from said pipes and extending through the other of said trunnions to a source of fluid supply for simultaneously supplying a fluid under pressure to the treated material in all of said members to assist in removing the same from said filtering pans.

6. In a device of the class described, the same comprising a plurality of super-imposed horizontally disposed pans, a filtering member mounted in each of said pans, comprising sheets of filtering material, trunnions extended from the end of said pans and by which the same are supported, means for simultaneously feeding the material to be treated to all of said pans, apertured pipes arranged between said filtering sheets and connections from said apertured pipes to a source of suction for simultaneously withdrawing the liquid from the material in all of said members.

7. In a device of the class described, the same comprising a plurality of super-imposed horizontally disposed pans, a filtering member mounted in each of said pans, trunnions extended from the end of said pans and by which the same are supported, means for simultaneously feeding the material to be treated to all of said pans, comprising apertured pipes arranged above the filtering members and projecting outside of the pans, a trough common to both of said pipes, connections from said filtering members between the sheets thereof to a source of suction for simultaneously withdrawing the liquid from the material in all of said members, and means for simultaneously supplying a fluid under pressure to the treated material in all of said members to assist in removing the same from the filtering members.

8. In a device of the class described, the combination of horizontally disposed superimposed pans, trunnions extended from the ends of the lower pan, receptacles at the connecting portion of said trunnions with the pan, an elongated apertured pipe projecting over each pan, a delivery receptacle leading to both pipes, filtering members in each pan below said pipes, said filtering members comprising opposed sheets of filtering material, with the lowermost sheet having a water proof coating, means for delivering through the trunnion into one of said receptacles fluid under pressure, apertured pipes leading from said receptacle above each of said filtering members, suction means in communication with the other trunnion, and apertured conduits leading from the receptacle of said last mentioned trunnion to a point between the sheets of the filtering members.

In testimony whereof I have signed my name to this specification in the presence of two subscribing witnesses.

WALTER E. TRENT.

Witnesses:
  HARRY A. TOTTER,
  S. CONSTINE.